United States Patent
Heydari

(10) Patent No.: US 11,206,285 B2
(45) Date of Patent: *Dec. 21, 2021

(54) SYSTEMS AND METHODS FOR PREVENTING REMOTE ATTACKS AGAINST TRANSPORTATION SYSTEMS

(71) Applicant: Board of Trustees of the University of Alabama, for and on behalf of the University of Alabama in Huntsville, Huntsville, AL (US)

(72) Inventor: Vahid Heydari, Laurel, MD (US)

(73) Assignee: Board of Trustees of the University of Alabama, ..., Huntsville, AL (US)

(*) Notice: Subject to any disclaimer, the term of this patent is extended or adjusted under 35 U.S.C. 154(b) by 63 days.

This patent is subject to a terminal disclaimer.

(21) Appl. No.: 16/732,803

(22) Filed: Jan. 2, 2020

(65) Prior Publication Data

US 2020/0204579 A1    Jun. 25, 2020

Related U.S. Application Data

(63) Continuation of application No. 15/461,099, filed on Mar. 16, 2017, now Pat. No. 10,554,683.
(Continued)

(51) Int. Cl.
*H04L 29/06* (2006.01)
*H04W 12/10* (2021.01)
(Continued)

(52) U.S. Cl.
CPC ...... *H04L 63/1441* (2013.01); *H04L 61/2007* (2013.01); *H04L 63/1416* (2013.01);
(Continued)

(58) Field of Classification Search
CPC ............ H04L 63/1441; H04L 61/2007; H04L 61/6059; H04L 67/42; H04W 21/10
(Continued)

(56) References Cited

U.S. PATENT DOCUMENTS

| 7,152,238 B1* | 12/2006 | Leung | H04W 12/06 |
| | | | 726/2 |
| 2003/0016655 A1* | 1/2003 | Gwon | H04W 36/125 |
| | | | 370/352 |

(Continued)

*Primary Examiner* — Michael S McNally
(74) *Attorney, Agent, or Firm* — Maynard, Cooper & Gale, P.C.; Brian Sattizahn

(57) ABSTRACT

Systems and methods are provided to implement moving target defense techniques for transportation systems. The moving target defense techniques can randomly change the IP addresses of the nodes associated with both the vehicles and the corresponding control centers. The nodes for the vehicles and the control centers can be "mobile" nodes that use a "care-of" IP address for communications. The care-of address used by the nodes can be updated through a binding update process. During the binding update process, the one node sends the binding update notice (with a new care-of address) to the care-of address of the other node while maintaining its prior care-of address. The node that receives the binding update notice can send a binding acknowledgement back to the node that sent the binding update. Once the binding acknowledgement is received, the prior care-of address can be removed by the node that sent the binding update.

18 Claims, 5 Drawing Sheets

Related U.S. Application Data

(60) Provisional application No. 62/338,665, filed on May 19, 2016.

(51) Int. Cl.
*H04L 29/12* (2006.01)
*H04W 80/04* (2009.01)

(52) U.S. Cl.
CPC ...... *H04L 63/1433* (2013.01); *H04L 63/1458* (2013.01); *H04W 12/10* (2013.01); *H04L 61/6059* (2013.01); *H04L 67/42* (2013.01); *H04W 80/04* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 2005/0008032 A1* | 1/2005 | Yamamoto | .......... | H04W 80/045 370/466 |
| 2007/0214501 A1* | 9/2007 | Muramoto | .......... | H04L 63/0236 726/11 |
| 2008/0043739 A1* | 2/2008 | Suh | .................. | H04W 8/082 370/392 |
| 2009/0257401 A1* | 10/2009 | Hirano | .............. | H04W 36/0011 370/331 |

* cited by examiner

SYSTEMS AND METHODS FOR PREVENTING REMOTE ATTACKS AGAINST TRANSPORTATION SYSTEMS

CROSS-REFERENCE TO RELATED APPLICATIONS

This application is a continuation of U.S. application Ser. No. 15/461,099, entitled "Systems and Methods for Preventing Remote Attacks Against Transportation Systems" and filed on Mar. 16, 2017, which claims the benefit of U.S. Provisional Application No. 62/338,665, entitled "Moving Target Defense Systems and Methods" and filed on May 19, 2016, both of which applications are hereby incorporated by reference in their entirety.

BACKGROUND

The present application generally relates to system and methods for preventing attacks against a transportation system using the Internet for communications. Specifically, the present application is direct to preventing attacks against an aircraft avionics system and corresponding ground station by dynamically changing the IP (Internet Protocol) addresses used by both the aircraft avionics system and the ground station.

Computer technology is being used in many modern transportation systems for vehicles, trains and airplanes. The computer technology used with a transportation system can be susceptible to similar kinds of vulnerabilities and security problems found in networked computers. One type of transportation system can incorporate an aircraft avionics system that is used by many airplanes and/or aircraft to assist the pilot and other personnel with the operation of the aircraft.

Some aircraft avionics systems can be connected to the Internet via one or more satellites. The avionics systems can also include a Wi-Fi passenger network component as well as aircraft critical components such as control systems, flight safety systems and navigation systems. Since the aircraft uses a single avionics system, the critical components of the avionics system may be accessible through the passenger Wi-Fi network and/or via the Internet. Thus, an attacker may be able to obtain unauthorized access and control of the critical components (e.g., the navigation system) of the avionics system either remotely or from on-board the aircraft.

Some techniques used to prevent or limit attacks on an avionics systems can include isolating the critical components of the avionics system through the use of firewalls and intrusion detection and prevention systems, requiring pilot involvement before permitting changes to the critical components of the avionics system, and attempting to keep the design and technology of the avionics system secret. However, none of these techniques can prevent all attacks and some of the techniques may even be inoperable or problematic when the avionics system has to incorporate an uninterruptable autopilot system for emergency situations. An uninterruptable autopilot system, when engaged, is connected via satellite to air traffic control and one or more authorized remote entities and prevents anyone on-board the aircraft from controlling the aircraft. One drawback to the use of an uninterruptable autopilot system is the potential for an attacker to access and control the aircraft's avionics system and uninterruptable autopilot system.

SUMMARY

The present application generally pertains to moving target defense systems and methods for critical systems such as aircraft avionics systems and corresponding ground stations. The moving target defense systems and methods can randomly change the IP addresses used by both the aircraft avionics system and the ground station. The aircraft avionics system and the ground station can each be a "mobile" node that uses a "care-of" IP address for communications. The care-of address for each of the aircraft avionics system and the ground station can be changed at a predefined interval. The care-of address used for the aircraft avionics system or the ground station, which can be referred to as peer nodes, can be updated through a binding update process. During the binding update process, the one peer node sends the binding update notice (with a new care-of address) to the care-of address of the other peer node while maintaining its prior care-of address. The peer node that receives the binding update notice can send a binding acknowledgement back to the peer node that sent the binding update notice. Once the binding acknowledgement is received, the prior care-of address can be removed by the peer node that sent the binding update notice.

One advantage of the present application is the elimination of packet losses during IP address changes.

Another advantage of the present application is that the network protocol does not have to be modified.

Still another advantage of the present application is that attackers may have difficulty identifying the IP addresses of the aircraft avionics system and ground station.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to systems and methods for preventing a remote attack against the nodes (or computers) of a transportation system that communicates using the Internet. The transportation system can include one or more vehicles (e.g., aircraft, trains, buses, etc.) incorporating computerized control systems (e.g., aircraft avionics systems, train control systems, etc.) that communicate with corresponding control centers or ground stations (e.g., an airport control tower, train dispatcher's office, etc.) via the Internet. The present application uses moving target defense techniques for the nodes (e.g., the vehicle computer systems and the control center computer systems) of the transportation system to provide the nodes with dynamically changing IP addresses. Thus, the source and destination addresses used in packets exchanged by the nodes can both be dynamic IP addresses.

The moving target defense system and methods can dynamically change the care-of address of the nodes (e.g., the vehicle computer systems and the control center computer systems), effectively making the nodes mobile nodes, even though a node may not actually be mobile. A predetermined shuffling interval can be used to determine when to change the care-of address. In addition, to avoid dropping packets when changing the care-of address of a node, the node changing addresses stores a copy of its prior address in memory and is able to receive packets addressed with the prior address while informing the other nodes of its new address. Once the node changing addresses has received acknowledgements from the other nodes indicating that the other nodes have received the new address, the node changing addresses can delete the prior address from memory and only receive packets addressed with the new address.

The present application is described in the context of an aircraft avionics system communicating with a ground station, but it is to be understood that the present application can be used in any transportation system that uses the Internet for communication between the nodes of the transportation system.

Figure 1:
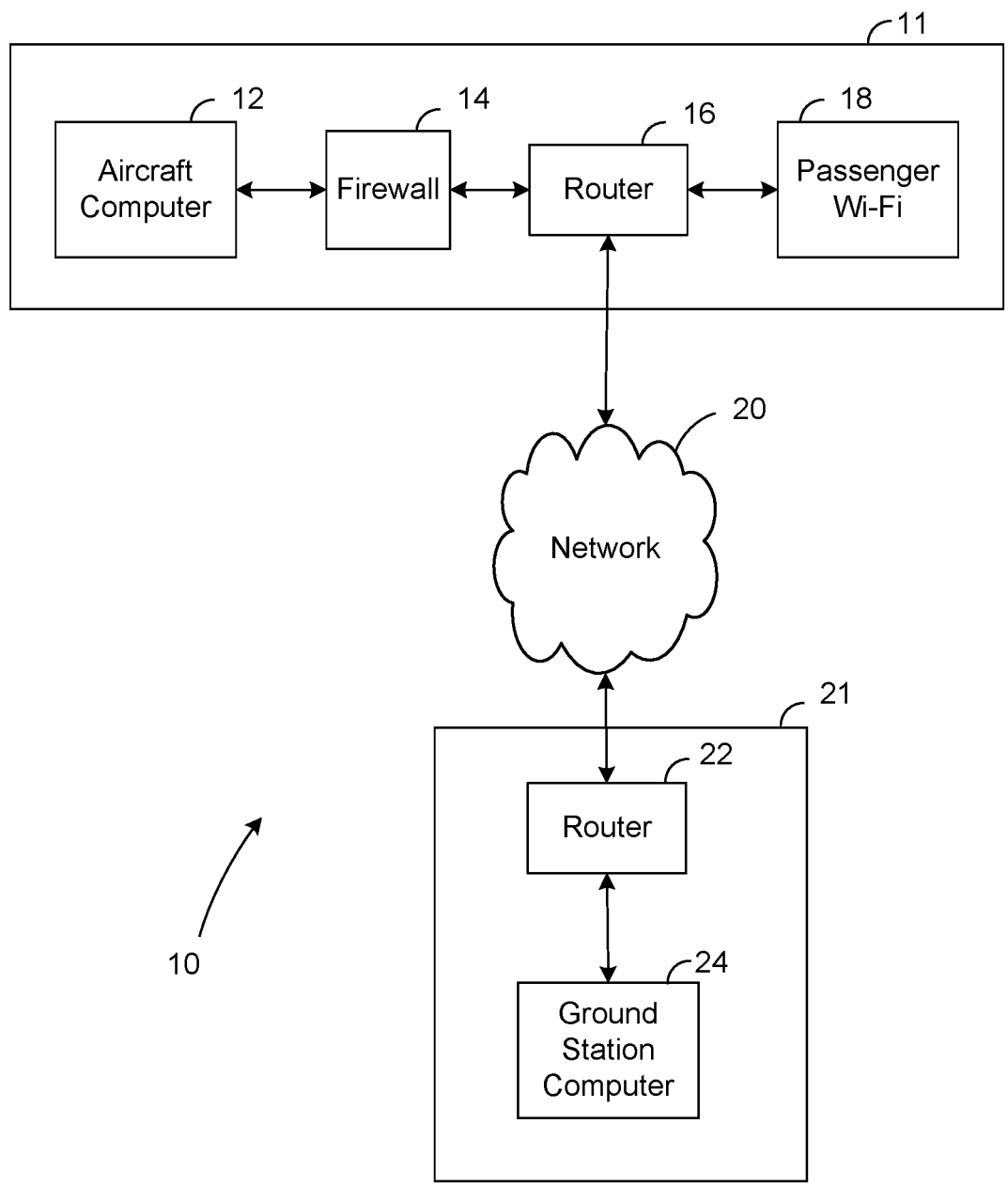
FIG. 1 shows a block diagram of an embodiment of a computer network.

FIG. 1 shows an embodiment of a computer network 10. The network 10 provides for communication between an aircraft 11 and a corresponding ground station 21 via network 20. An aircraft computer 12 of the aircraft 11 is communicatively coupled to the network 20 by a router 16 to exchange, i.e., send and receive, instructions, data and/or information with a ground station computer 24. The ground station computer 24 of the ground station 21 can be communicatively coupled to the network 20 by a router 22 to exchange, i.e., send and receive, instructions, data and/or information with the aircraft computer 12.

The aircraft computer 12 can be coupled to the router 16 by a firewall 14 and the router 16 can be coupled to network 20 to provide a communication path from the aircraft computer 12 to the network 20. The firewall 14 can be used to limit traffic to the aircraft computer 12. A passenger Wi-Fi network 18 can also be coupled to the router 16 and used to provide wireless broadband services to the passengers of the aircraft 11. The ground station computer 24 can be coupled to the router 22 and the router 22 can be coupled to the network 20 to provide a communication path from the ground station computer 24 to the network 20. In other embodiments, one or more of the aircraft computer 12 and the ground station computer 24 may be coupled directly to network 20 without using a router. In an embodiment, the network 20 can be the Internet and use the transmission control protocol/Internet protocol (TCP/IP) to communicate over the network 20. Due to the potentially large distances between the aircraft 11 and the ground station 21, the network 20 can incorporate one or more satellites (not shown) to facilitate communication between the aircraft 11 and the ground station 21 in some embodiments.

Figure 2:
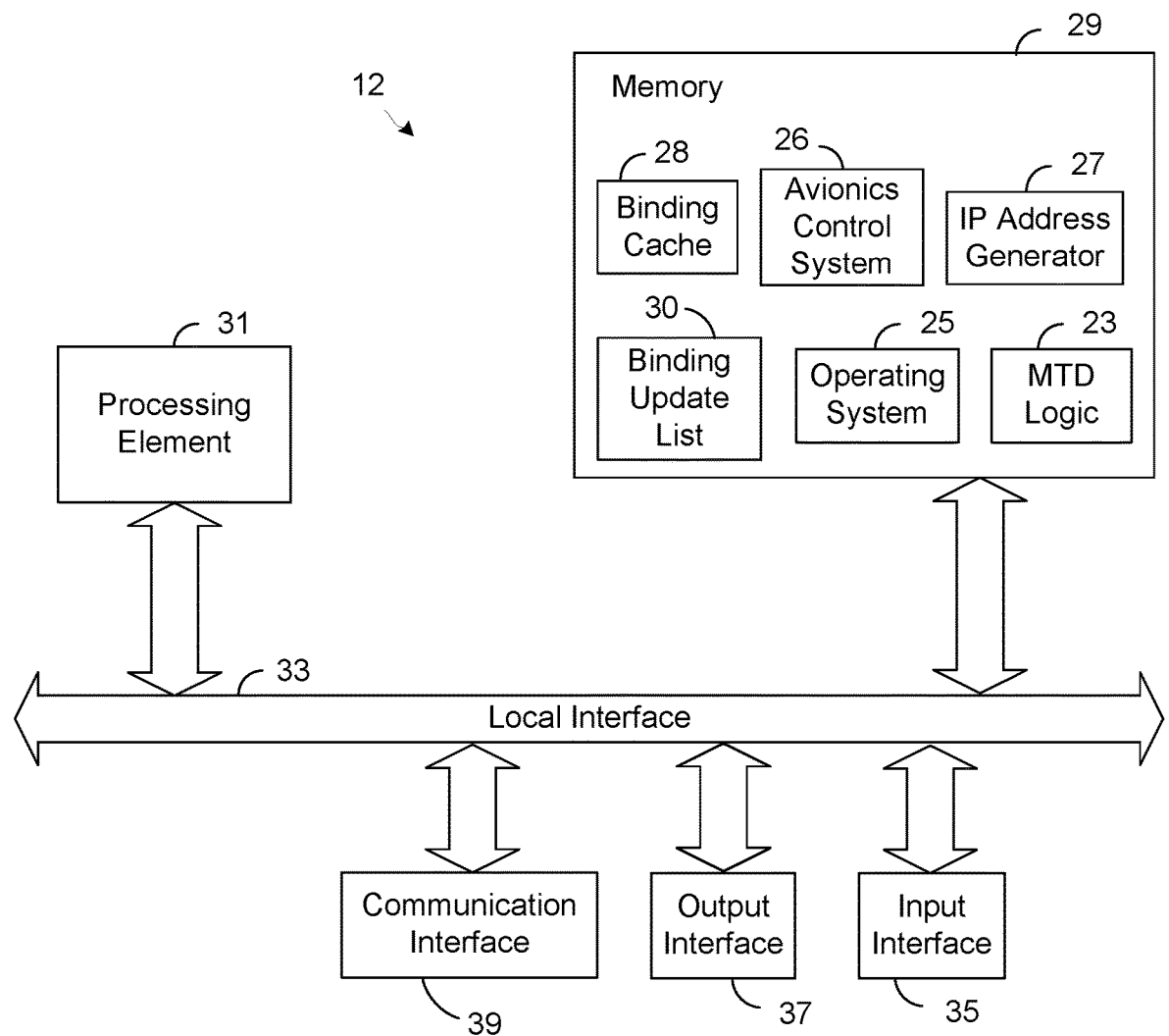
FIG. 2 shows a block diagram of an aircraft computer from the computer network of FIG. 1.

FIG. 2 depicts an embodiment of the aircraft computer 12. The aircraft computer 12 may include any device(s) capable of processing and communicating data, such as embedded computers (e.g., application specific standard processors (ASSPs), systems-on-chips (SoCs), or single board computers (SBCs)), real-time computers, programmable logic controllers (PLC) or Human Machine Interfaces (HMI) of Supervisory Control And Data Acquisition (SCADA) systems. The aircraft computer 12 has an operating system 25 for generally controlling the operation of the aircraft computer 12. The aircraft computer 12 also has MTD (moving target defense) logic 23 that operates in conjunction with the operating system 25 to control the IP (Internet protocol) addresses used by the aircraft computer 12 when communicating over network 20. The MTD logic 23 can use random IP addresses generated by the IP address generator 27. The aircraft computer 12 can have an avionics control system 26 that can be used to control operation of the aircraft 11 and can provide services such as flight control, navigation, collision detection and any other suitable operational control. The operating system 25, MTD logic 23, avionics control system 26 and IP address generator 27 can be implemented in software, hardware, firmware or any combination thereof. In the aircraft computer 12 shown by FIG. 2, the operating system 25, MTD logic 23, avionics control system 26 and IP address generator 27 can be implemented in software and stored in memory 29. Note that the operating system 25, MTD logic 23, avionics control system 26 and IP address generator 27, when implemented in software, can be stored and transported on any computer-readable medium for use by or in connection with an instruction execution apparatus that can fetch and execute instructions.

The aircraft computer 12 has at least one conventional processing element 31, which has processing hardware for executing instructions stored in memory 29. As an example, the processing element 31 may include a central processing unit (CPU) or a digital signal processor (DSP). The processing element 31 communicates to and drives the other elements within the aircraft computer 12 via a local interface 33, which can include at least one bus. Furthermore, an input interface 35, for example, a keypad, keyboard or a mouse, can be used to input data from a user of the aircraft computer 12, and an output interface 37, for example, a printer, monitor, liquid crystal display (LCD), or other display apparatus, can be used to output data to the user. Further, a communication interface 39, such as at least one modem, may be used to communicate with the router 16 (via firewall 14) and/or network 20.

The aircraft computer 12 can also include a binding cache 28 and a binding update list 30 stored in memory 29. The binding cache 28 can store binding information relating to nodes or computers that may receive packets from the aircraft computer 12. The binding update list 30 can store binding information relating to the binding updates sent by the aircraft computer 12. In one embodiment, the first entries in the binding cache 28 and the binding update list 30 can be set manually in the aircraft computer 12 in a system initialization step.

Figure 3:
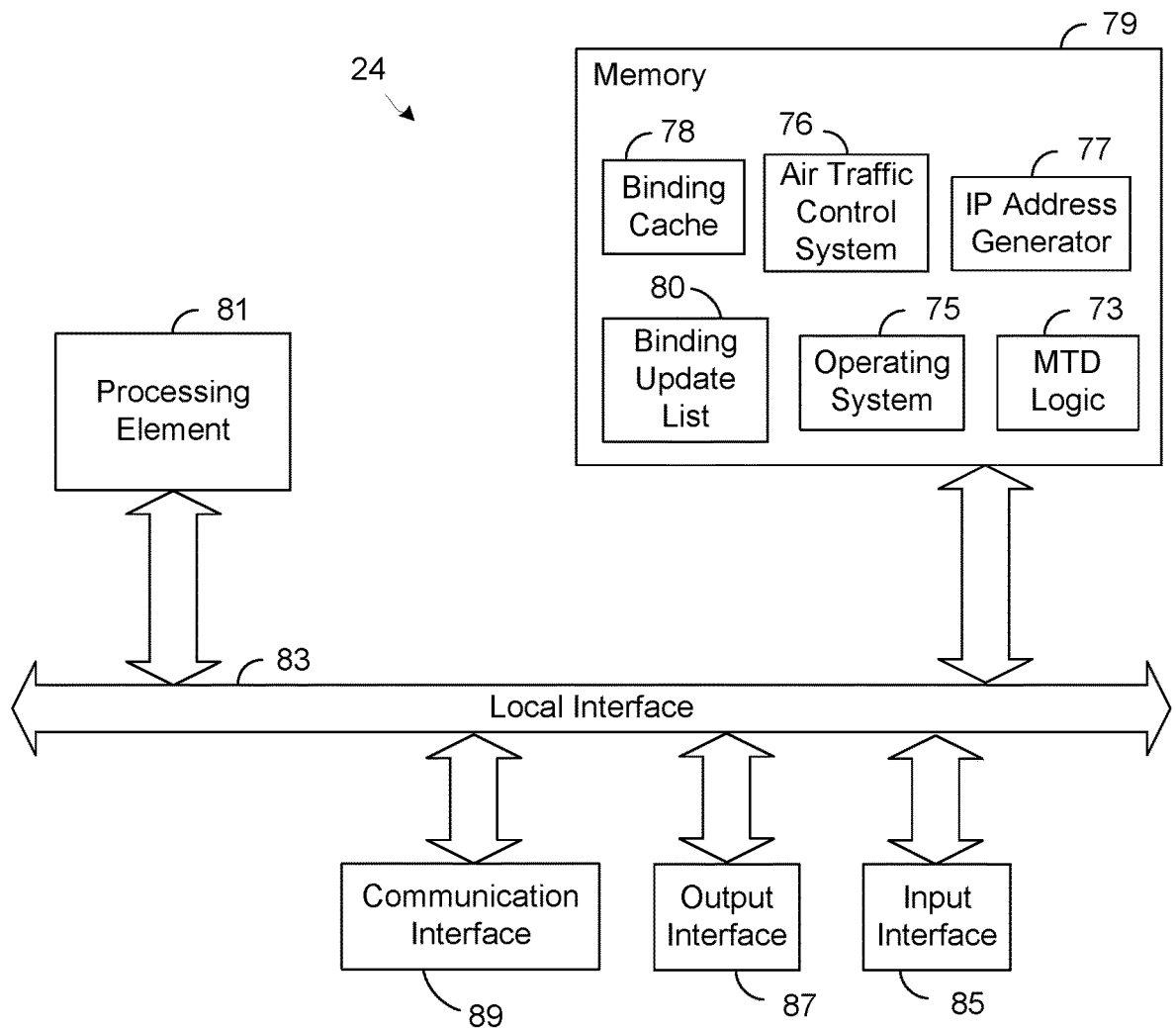
FIG. 3 shows a block diagram of a ground station computer from the computer network of FIG. 1.

FIG. 3 depicts an embodiment of the ground station computer 24. The ground station computer 24 may include any device(s) capable of processing and communicating data, such as embedded computers (e.g., application specific standard processors (ASSPs), systems-on-chips (SoCs), or single board computers (SBCs)), real-time computers, programmable logic controllers (PLC) or Human Machine Interfaces (HMI) of Supervisory Control And Data Acquisition (SCADA) system. The ground station computer 24 has an operating system 75 for generally controlling the operation of the ground station computer 24. The ground station computer 24 also has MTD (moving target defense) logic 73 that operates in conjunction with the operating system 75 to control the IP (Internet protocol) addresses used by the ground station computer 24 when communicating over network 20. The MTD logic 73 can use random IP addresses generated by the IP address generator 77. The ground station computer 24 has an air traffic control system 76 that can be used to control the flight paths of the aircraft 11 near the ground station 21. The operating system 75, MTD logic 73, air traffic control system 76 and IP address generator 77 can be implemented in software, hardware, firmware or any combination thereof. In the ground station computer 24 shown by FIG. 3, the operating system 75, MTD logic 73, air traffic control system 76 and IP address generator 77 can be implemented in software and stored in memory 79. Note that the operating system 75, MTD logic 73, air traffic control system 76 and IP address generator 77, when implemented in software, can be stored and transported on any computer-readable medium for use by or in connection with an instruction execution apparatus that can fetch and execute instructions.

The ground station computer 24 has at least one conventional processing element 81, which has processing hardware for executing instructions stored in memory 79. As an example, the processing element 81 may include a central processing unit (CPU) or a digital signal processor (DSP). The processing element 81 communicates to and drives the other elements within the ground station computer 24 via a local interface 83, which can include at least one bus. Furthermore, an input interface 85, for example, a keypad, keyboard or a mouse, can be used to input data from a user of the ground station computer 24, and an output interface 87, for example, a printer, monitor, liquid crystal display (LCD), or other display apparatus, can be used to output data to the user. Further, a communication interface 89, such as at least one modem, may be used to communicate with the router 22 and/or network 20.

The ground station computer 24 can also include a binding cache 78 and a binding update list 80 stored in memory 79. The binding cache 78 can store binding information relating to nodes or computers that may receive packets from the ground station computer 24. The binding update list 80 can store binding information relating to the binding updates sent by the ground station computer 24. In one embodiment, the first entries in the binding cache 78 and the binding update list 80 can be set manually in the ground station computer 24 in a system initialization step.

The MTD logic 23, 73 used in both the aircraft computer 12 and the ground station computer 24 can be used to prevent remote attacks against the aircraft computer 12 and the ground station computer 24 by providing dynamic IP addresses for the aircraft computer 12 and the ground station computer 24. In one embodiment, the MTD logic 23, 73 can be based on Mobile IPv6 (Internet Protocol version 6). The MTD logic 23, 73 uses home addresses of the aircraft computer 12 and the ground station computer 24 to be the permanent addresses of the aircraft computer 12 and the ground station computer 24. The MTD logic 23, 73 uses care-of addresses of the aircraft computer 12 and the ground station computer 24 to be the dynamic IP addresses provided to the peer computers (i.e., the other computers connected to the aircraft computer 12 or the ground station computer 24) via network 20. Additional information regarding the operation of the MTD logic 23, 73 and IP address generators 27, 77 can be found in U.S. Provisional Application No. 62/338,665, entitled "Moving Target Defense Systems and Methods" and filed on May 19, 2016, which application is incorporated herein by reference in its entirety.

In one embodiment, the home addresses of the aircraft computer 12 and the ground station computer 24 can be assigned an IP address that is different from any possible care-of addresses that may be used by the aircraft computer 12 and the ground station computer 24. For example, the IP address of the home address for the aircraft computer 12 or the ground station computer 24 can have a prefix that is different from a subnet received by the aircraft computer 12 or the ground station computer 24 from a route advertisement message. By receiving a different prefix in the route advertisement message, the aircraft computer 12 or the ground station computer 24 can think it is in a foreign network and can register a care-of address in the network.

For example, the care-of address for the aircraft computer 12 may use a portion of the IP address for the router 16 connected to the aircraft computer 12 and the home address would be assigned an address such that the portion of the IP address for the router 16 used in the care-of address is not used for the home address. Similarly, the care-of address for the ground station computer 24 may use a portion of the IP address for the router 22 connected to the ground station computer 24 and the home address would be assigned an address such that the portion of the IP address for the router 22 used in the care-of address is not used for the home address.

Only the care-of address of the aircraft computer 12 is accessible by the ground station computer 24 (or other peer computers) and only the care-of address of the ground station computer 24 is accessible by the aircraft computer 12 (or other peer computers). The corresponding IP address generators 27, 77 can be used to dynamically rotate the care-of address of the aircraft computer 12 and the ground station computer 24 for the corresponding MTD logic 23, 73. The use of the home address as the permanent address for the aircraft computer 12 and the ground station computer 24 can provide transparency to applications operating on the aircraft computer 12 and the ground station computer 24. In addition, since the aircraft computer 12 and the ground station computer 24 can be connected to the network 18 via routers 16, 22, the home addresses are not accessible through the network 20. The only accessible IP addresses of the aircraft computer 12 and the ground station computer 24 are the care-of addresses which can be rotated randomly and dynamically.

The MTD logic 23, 73 (through Mobile IPv6) enables the peer computers to cache the binding of the aircraft computer's or the ground station computer's permanent IP address (the home address) with its dynamic IP address (the care-of address) and then send any packets destined for the aircraft computer 12 or the ground station computer 24 directly to the aircraft computer 12 or the ground station computer 24 using the dynamic IP address. A binding update mechanism/process can be used to inform the peer computers of changes to the dynamic IP address of the aircraft computer 12 or the ground station computer 24. The peer computers can use the new dynamic IP address from the aircraft computer 12 or the ground station computer 24 only after receiving the new address in a binding update message from the aircraft computer 12 or the ground station computer 24, which has registered the new dynamic IP address.

As part of the registration process discussed above, the aircraft computer 12 or the ground station computer 24 is connected to network 20 and the MTD logic 23, 73 with IP address generator 27, 77 can create a care-of address for the aircraft computer 12 or the ground station computer 24, based on information received in a route advertisement message from the router 16, 22 connected to the aircraft computer 12 or the ground station computer 24, using the stateless address auto configuration capability of IPv6. The MTD logic 23, 73 can then bind the care-of address for the aircraft computer 12 or the ground station computer 24 to the home address for the aircraft computer 12 or the ground station computer 24. Once the binding of the home address and the care-of address is complete, the aircraft computer 12 or the ground station computer 24 are not accessible by the home address. Thus, a new peer computer connecting to network 20 cannot have access to the aircraft computer 12 or the ground station computer 24 by the home address of the aircraft computer 12 or the ground station computer 24.

The MTD logic 23, 73 can then start the route optimization process by sending a packet from the aircraft computer 12 or the ground station computer 24 to each other peer computer using a static shared key method. The aircraft computer 12 or the ground station computer 24 can send a binding update message to each peer computer and wait to receive a corresponding binding acknowledgement message from each peer computer. In one embodiment, the MTD logic 23, 73 can use static shared key during the binding update procedure. In another embodiment, the MTD logic 23, 73 can use Internet Protocol Security (IPsec) with Internet Key Exchange (IKE) during the binding update procedure. Both security methods may also be used for transmitting data packets between the aircraft computer 12 and ground station computer 24.

The binding update list 30, 80 of the aircraft computer 12 or the ground station computer 24 stores information for each binding update sent by the aircraft computer 12 or the ground station computer 24. The binding update list 30, 80 includes all bindings sent by the aircraft computer 12 or the ground station computer 24 either to its home agent (e.g., router 16, 22) or peer computers. For multiple binding updates sent to the same destination address, the binding update list 30, 80 can include only the most recent binding update sent to that destination address. The binding update list 30, 80 can be used to determine whether a particular packet is sent directly to the peer computer or tunneled via the home agent. Each entry in the binding update list 30, 80 can include fields for: the IP address of the node to which a binding update was sent; the home address of the aircraft computer 12 or the ground station computer 24 sending the binding update; and the care-of address sent in that binding update.

The binding cache 28, 78 of the aircraft computer 12 or the ground station computer 24 records information relating to the bindings of other nodes or peer computers. Each entry in the binding cache 28, 78 can include fields for: the home address of the peer computer providing the binding information to be entered into the binding cache; and the care-of address for the peer computer indicated by the home address field in the binding cache entry. The home address field in the binding cache entry is used as the key for searching the binding cache for the destination address of a packet being sent. Each time the aircraft computer 12 or the ground station computer 24 executes a change of its care-of address, the aircraft computer 12 or the ground station computer 24 can send binding update messages to all of the peer computers listed in the binding update list 30, 80.

Figure 4:
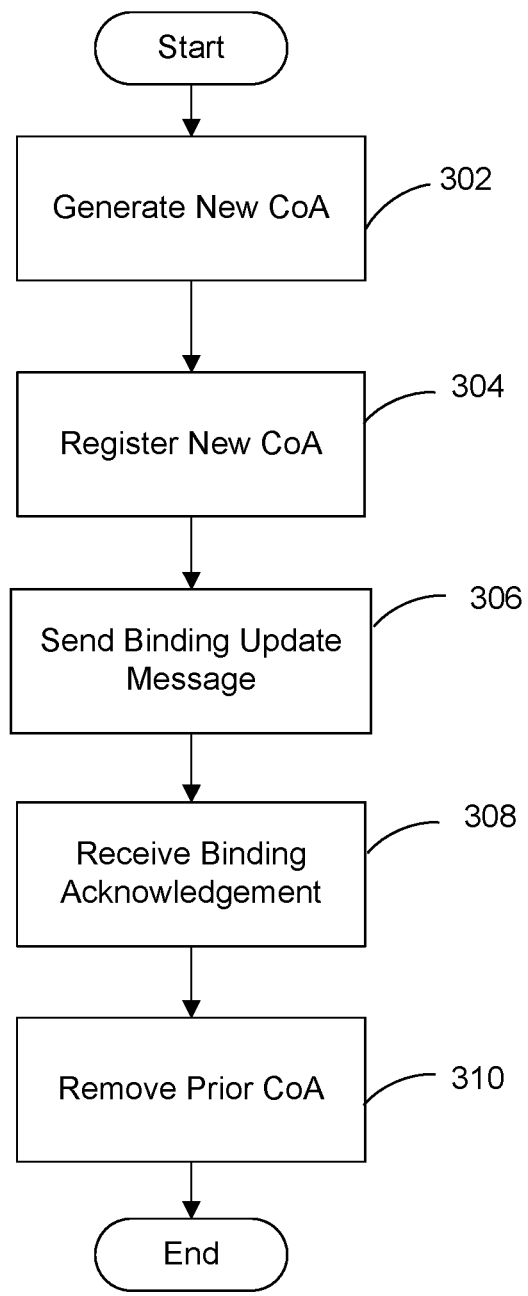
FIG. 4 is a process diagram showing an embodiment for changing the IP address of the aircraft computer or the ground station computer from the computer network of FIG. 1.

FIG. 4 shows an embodiment of a process for updating the care-of address of the aircraft computer 12 or the ground station computer 24. The process begins by generating a new CoA (care-of address) by the corresponding IP address generator 27, 77 (step 302). The IP address generator 27, 77 can randomly generate a new IP address as the CoA of the aircraft computer 12 or the ground station computer 24. The IP address generator 27, 77 can create a random 64 bit address and combine the randomly created address with the highest significant 64 bits of the current CoA to generate the new CoA. In other embodiments, the random portion of the new CoA and the highest significant bits portion of the new CoA can be of different bit lengths depending on the size of the CoA and the desired amount randomness to be incorporated into the new CoA. The new CoA is then checked to determine if it is unoccupied, i.e., available, by sending a neighbor solicitation message before registering the new CoA. The MTD logic 23, 73 can then detect if an address collision occurred, i.e., the new CoA is being used by another device. If an address collision occurred, the process generates another CoA and checks to see if it is unoccupied.

If no collision is detected, then the new CoA can be registered (step 304). When the new CoA is registered the prior CoA can be maintained in memory in order for the aircraft computer 12 or the ground station computer 24 to receive messages from peer computers during the update process. The MTD logic 23, 73 can then send a binding update message (step 306) to the peer computers connected to the aircraft computer 12 or the ground station computer 24 to inform the peer computers of the new CoA. In one embodiment, the aircraft computer 12 or the ground station computer 24 can check its binding cache 28, 78 before sending the binding update message in order to send the binding update message directly to the CoAs of the peer computers (i.e., the destination address is the CoA of the peer computer) without having to use any home agents.

In one embodiment, IPsec should be used for encryption and as a proof of home address ownership when sending a binding update message. The peer computer receiving a binding update message protected by IPsec has proof of home address ownership by the aircraft computer 12 or the ground station computer 24. When IPsec is used to communicate packets between two peer computers, every packet can contain a simple piece of information (e.g., a security parameter index) that gives access to address information for both peers and the shared key. IPsec can be used for the route optimization process such that there is not a need for any home agent in the network and the home addresses are not accessible.

The aircraft computer 12 or the ground station computer 24 can receive a binding acknowledgement message from each of the peer computers (step 308) notifying the aircraft computer 12 or the ground station computer 24 that the peer computers have been informed of the new CoA. Once the aircraft computer 12 or the ground station computer 24 has received binding acknowledgements from the peer computers, the aircraft computer 12 or the ground station computer 24 can remove the prior CoA from memory (step 310).

In one embodiment, the process of FIG. 4 can be repeated on a predetermined interval, which can be referred to as a shuffling interval. The shuffling interval can range from shorter time periods such as 5 or 10 seconds (down to about 2 seconds) to longer time periods such as 1 or 2 minutes (or greater) depending on the activity at the aircraft computer 12 or the ground station computer 24. During the update procedure, the aircraft computer 12 or the ground station computer 24 can be accessed by the peer computers since the aircraft computer 12 or the ground station computer 24 maintains the prior CoA during the update procedure.

Figure 5:
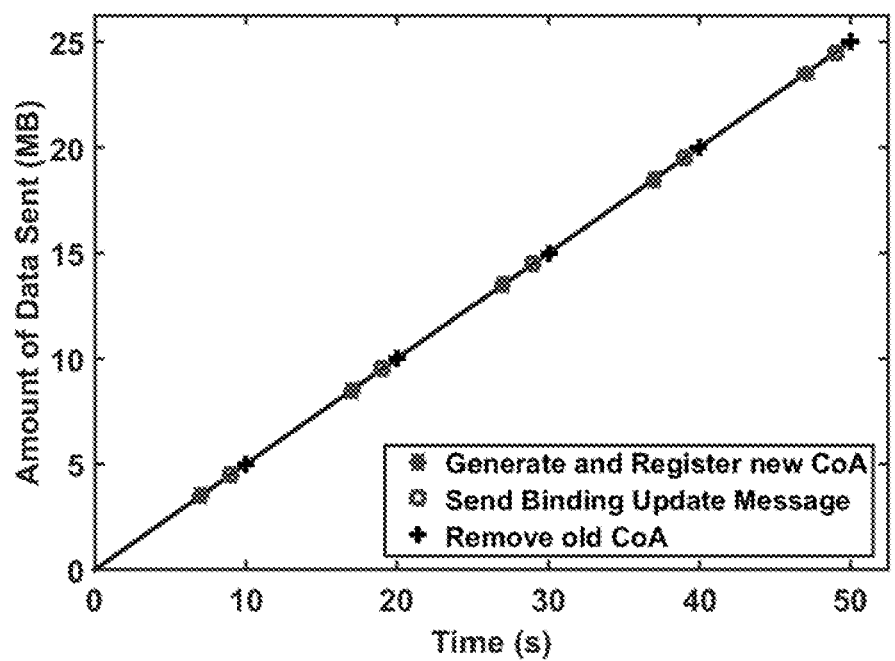
FIG. 5 is a graph showing the amount of data sent versus time during executions of the process of FIG. 4.

In one example, the aircraft computer 12 can send 1000 TCP packets per second (each packet being 500B (bytes)) to the ground station computer 24 over a 50 second time period. The shuffling interval used by the aircraft computer 12 can be 10 seconds. The signaling overhead at a node, per update, can be 268B to about 316B (from the binding update message and the binding acknowledgement message). The data signaling packet overhead can be 24B (from the IPsec header). As shown in FIG. 5, there is no packet loss in the transmissions over the 50 second time period. In addition, FIG. 5 also shows the shuffling interval transitions from the process of FIG. 4.

In an embodiment, the new CoA should be created and announced by a binding update message before removing the previous CoA. The old CoA can be removed after receiving the binding acknowledgement message(s) from the peer computers. The aircraft computer 12 or the ground station computer 24 should generate a new CoA and make sure that the IP address for the new CoA is free (e.g., by neighbor solicitation message). Then the aircraft computer 12 or the ground station computer 24 should send a ping from the new CoA to its router 16, 22 to put the new CoA (with the MAC address) in the router's table, Then the aircraft computer 12 or the ground station computer 24 should send the binding update message to the peer computers and after receiving the binding acknowledgement messages from the peer computers, the aircraft computer 12 or the ground station computer 24 can remove the previous CoA.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for dynamically updating addresses for nodes of a transportation system, the method comprising:
    dynamically generating a first Internet Protocol (IP) address for a first node at a first interval, the first IP address replacing a prior first IP address for the first node, wherein the first node is a first component of a transportation system;
    dynamically generating a second IP address for a second node at a second interval, the second IP address replacing a prior second IP address for the second node, wherein the second node is a second component of the transportation system in communication with the first node;
    communicating, by the first node, the first IP address to the second node;
    communicating, by the second node, the second IP address to the first node;
    addressing, by the first node, packets for the second node with the second IP address received from the second node; and
    addressing, by the second node, packets for the first node with the first IP address received from the first node.

2. The method of claim 1, wherein the communicating the first IP address includes:
    sending a binding update message with the first IP address to the second node; and
    receiving, by the first node, a binding acknowledgement from the second node indicating that the second node has received the first IP address from the first node.

3. The method of claim 2, further comprising:
    accepting, by the first node, packets from the second node using the first IP address upon receipt of the binding acknowledgement by the first node; and
    rejecting, by the first node, packets from the second node using the prior first IP address upon receipt of the binding acknowledgement by the first node.

4. The method of claim 2, further comprising accepting, by the first node, packets from the second node using the prior first IP address after sending the binding update message to the second node.

5. The method of claim 2, further comprising:
    storing, by the first node, the prior first IP address in memory in response to the generation of the first IP address; and
    deleting, by the first node, the prior first IP address from the memory in response to the receipt of the binding acknowledgement.

6. The method of claim 2, wherein the sending the binding update message includes:
    searching a binding cache, by the first node, for the second IP address used by the second node; and
    inserting the second IP address used by the second node as a destination address of the binding update message.

7. The method of claim 2, further comprising storing, by the first node, information relating to the sending the binding update message to the second node in a binding update list.

8. The method of claim 1, wherein the communicating the second IP address includes:
    sending a binding update message with the second IP address for the second node to the first node;
    receiving, by the second node, a binding acknowledgement from the first node indicating that the first node has received the second IP address for the second node.

9. The method of claim 8, further comprising:
    accepting, by the second node, packets from the first node using the second IP address for the second node upon receipt of the binding acknowledgement by the second node; and
    rejecting, by the second node, packets from the first node using the prior second IP address for the second node upon receipt of the binding acknowledgement by the second node.

10. A transportation system comprising:
    a plurality of vehicles, each vehicle of the plurality of vehicles having a corresponding vehicle computer configured to control operation of the vehicle;
    a control station computer communicatively coupled to each vehicle computer of the plurality of vehicles by a network, the control station computer configured to control a path of each vehicle of the plurality of vehicles;
    each vehicle computer having a vehicle address when communicating with the control station computer, each vehicle computer configured to dynamically change the vehicle address at a first interval;
    the control station computer having a control station address, the control station computer configured to dynamically change the control station address at a second interval; and
    wherein each vehicle computer is configured to use the control station address when addressing packets to the control station computer and the control station computer is configured to use the corresponding vehicle address when addressing packets to a vehicle computer.

11. The transportation system of claim 10, wherein the plurality of vehicles comprise at least one of a plurality of aircraft, a plurality of trains or a plurality of buses.

12. The transportation system of claim 10, wherein each vehicle computer is configured to execute a binding update process when changing the corresponding vehicle address from a prior vehicle address to a new vehicle address, each vehicle computer configured to receive packets using the prior vehicle address from the control station computer during the binding update process.

13. The transportation system of claim 12, wherein each vehicle computer is configured to send a corresponding vehicle binding update message to the control station computer during the binding update process, and the control station computer is configured to send a vehicle binding acknowledgement to a corresponding vehicle computer in response to receiving the vehicle binding update message.

14. The transportation system of claim 13, wherein each vehicle computer is configured to end the binding update process in response to receiving the vehicle binding acknowledgement from the control station computer.

15. The transportation system of claim 12, wherein the control station computer is configured to execute a binding update process when changing the control station address from a prior control station address to a new control station address, the control station computer configured to receive packets using the prior control station address from each vehicle computer during the binding update process.

16. The transportation system of claim 15, wherein the control station computer is configured to send a control station binding update message to each vehicle computer during the binding update process, and each vehicle computer is configured to send a control station binding acknowledgement to the control station computer in response to receiving the control station binding update message.

17. The transportation system of claim 16, wherein the control station computer is configured to end the binding update process in response to receiving the control station binding acknowledgement from each vehicle computer.

18. The transportation system of claim 10, wherein:
each vehicle computer comprises a first binding cache storing the control station address, each vehicle computer configured to retrieve the control station address in the first binding cache when sending a packet to the control station computer; and
the control station computer comprises a second binding cache storing each vehicle address for each vehicle computer of the plurality of vehicles, the control station computer configured to retrieve the corresponding vehicle address in the second binding cache when sending a packet to a vehicle computer.

* * * * *